United States Patent
Holmes et al.

(10) Patent No.: US 9,083,548 B2
(45) Date of Patent: Jul. 14, 2015

(54) APPARATUS AND METHODS TO COMMUNICATIVELY COUPLE FIELD DEVICES TO CONTROLLERS IN A PROCESS CONTROL SYSTEM

(75) Inventors: David Holmes, Georgetown, TX (US); Gary Keith Law, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1730 days.

(21) Appl. No.: 12/236,165

(22) Filed: Sep. 23, 2008

(65) Prior Publication Data
US 2010/0077111 A1 Mar. 25, 2010

(51) Int. Cl.
*H04L 12/40* (2006.01)
*H04L 29/08* (2006.01)
*H04L 29/06* (2006.01)
*H04L 12/26* (2006.01)

(52) U.S. Cl.
CPC .......... *H04L 12/40013* (2013.01); *H04L 67/12* (2013.01); *H04L 69/18* (2013.01); *G05B 2219/25014* (2013.01); *G05B 2219/25248* (2013.01); *H04L 12/2697* (2013.01); *H04L 43/50* (2013.01); *H04L 2012/40221* (2013.01); *H04L 2012/40254* (2013.01)

(58) Field of Classification Search
CPC ............ G05B 2219/25428; G05B 2219/25014
USPC .......................................................... 710/11
See application file for complete search history.

(56) References Cited

U.S. PATENT DOCUMENTS

| 4,982,371 A | 1/1991 | Bolan et al. |
| 5,158,464 A | 10/1992 | Landrini |

(Continued)

FOREIGN PATENT DOCUMENTS

| CN | 2627745 | 7/2004 |
| JP | 2008077660 | 4/2008 |

(Continued)

OTHER PUBLICATIONS

Torero IST-2001-37573 Total life cycle web-integerate control, Aug. 19, 2003, IST.*

(Continued)

*Primary Examiner* — Hyun Nam
(74) *Attorney, Agent, or Firm* — Hanley, Flight & Zimmerman, LLC

(57) ABSTRACT

Example apparatus and methods to communicatively couple field devices to controllers in a process control system are disclosed. An example method of changing a communication protocol of a first field device in a process control system includes decoupling from the first field device a first removable communication module configured to communicate using a first communication protocol. The example method also includes coupling to the first field device a second removable communication module configured to communicate using a second communication protocol. After coupling the second removable communication module, the first field device is configured to communicate using the second communication protocol. In addition, the first field device is coupled to a first communication channel on an input/output card when communicating using the first communication protocol and the first field device is coupled to the first communication channel on the input/output card when communicating using the second communication protocol.

35 Claims, 8 Drawing Sheets

(56) References Cited

U.S. PATENT DOCUMENTS

| | | | |
|---|---|---|---|
| 5,422,634 A | 6/1995 | Okubo | |
| 5,432,711 A | 7/1995 | Jackson et al. | |
| 5,828,851 A | 10/1998 | Nixon et al. | |
| 5,844,601 A | 12/1998 | McPheely et al. | |
| 5,867,669 A | 2/1999 | Breen et al. | |
| 5,970,430 A | 10/1999 | Burns et al. | |
| 5,991,530 A | 11/1999 | Okada et al. | |
| 6,055,633 A | 4/2000 | Schrier et al. | |
| 6,098,891 A | 8/2000 | Guthery et al. | |
| 6,192,281 B1 | 2/2001 | Brown et al. | |
| 6,255,988 B1 | 7/2001 | Bischoff | |
| 6,266,726 B1 | 7/2001 | Nixon et al. | |
| 6,374,315 B1 | 4/2002 | Okada et al. | |
| 6,453,687 B2 | 9/2002 | Sharood et al. | |
| 6,567,915 B1 | 5/2003 | Guthery | |
| 6,934,862 B2 | 8/2005 | Sharood et al. | |
| 6,959,356 B2* | 10/2005 | Packwood et al. | 710/315 |
| 7,246,194 B2 | 7/2007 | Train et al. | |
| 7,309,260 B2 | 12/2007 | Brower et al. | |
| 7,716,386 B1* | 5/2010 | Vasquez et al. | 710/19 |
| 2003/0014536 A1 | 1/2003 | Christensen et al. | |
| 2003/0023795 A1* | 1/2003 | Packwood et al. | 710/105 |
| 2004/0111238 A1 | 6/2004 | Kantzes et al. | |
| 2004/0193290 A1* | 9/2004 | Ott et al. | 700/18 |
| 2004/0260405 A1 | 12/2004 | Eddie et al. | |
| 2005/0222794 A1 | 10/2005 | Baird et al. | |
| 2005/0267641 A1 | 12/2005 | Nickerson et al. | |
| 2006/0160487 A1 | 7/2006 | Nam et al. | |
| 2008/0004726 A1 | 1/2008 | Gehring et al. | |
| 2008/0058964 A1 | 3/2008 | Nickerson et al. | |
| 2008/0126665 A1 | 5/2008 | Burr et al. | |
| 2013/0103877 A1 | 4/2013 | Burr et al. | |
| 2014/0149630 A1 | 5/2014 | Burr et al. | |

FOREIGN PATENT DOCUMENTS

| | | |
|---|---|---|
| JP | 2008092569 | 4/2008 |
| WO | 0123971 | 4/2001 |
| WO | 03013104 | 2/2003 |

OTHER PUBLICATIONS

British Intellectual Property Office, "Search Report under Section 17(5)," issued on Jan. 21, 2010, in connection with British Application No. GB0916592.9, 3 pages.

UK Intellectual Property Office, "UK Search Report," dated Dec. 6, 2007, in connection with British Application No. GB0718038.3 (3 Pages).

United States Patent and Trademark Office, "PCT International Search Report," dated Dec. 20, 2008, in connection with International Application No. PCT/US02/21698 (2 Pages).

James O. Gray Jr., "Integration Foundation Fieldbus into a Distribution Control System," Foundation Fieldbus in the real world, Seminar Amsterdam, Nov. 30, 2000, (35 Pages).

Examination Report under Section 18(3), issued by the British Intellectual Property Office in connection with British Application No. GB0916592.9, on Feb. 21, 2012, 2 pages.

State Intellectual Property Office of Peoples Republic of China, "Notification of the First Office Action," issued in connection with application No. 200910173573.3, Office Action, Mar. 4, 2013, 7 pages.

Extended European Search Report, issued by the European Patent Office in connection with European Patent Application No. 09171071.5, on Aug. 1, 2014, 8 pages.

Notification of the Third Office Action, English Version, issued by the State Intellectual Property Office of the P.R. China, in connection with Chinese Patent Application No. 200910173573.3, on Jun. 5, 2014, 3 pages.

English Translation of Notification of Reason(s) for Rejection, issued by the Japanese Intellectual Property Office in connection with Japanese Patent Application No. JP2009-218026, on Nov. 26, 2013, 3 pages.

English Translation of Notification of the Second Office Action, issued by the State Intellectual Property Office of the P.R. China, in connection with Chinese Patent Application No. 200910173573.3, on Nov. 26, 2013, 4 pages.

English Abstract of Japanese Patent No. JP2008077660.
English Abstract of Japanese Patent No. JP2008092569.

* cited by examiner

APPARATUS AND METHODS TO COMMUNICATIVELY COUPLE FIELD DEVICES TO CONTROLLERS IN A PROCESS CONTROL SYSTEM

FIELD OF THE DISCLOSURE

The present disclosure relates generally to process control systems and, more particularly, to apparatus and methods to communicatively couple field devices to controllers in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over the buses or other communication lines to the field devices to control the operation of the process control system.

A process control system can include field devices that provide several different functional capabilities and that are often communicatively coupled to process controllers using two-wire interfaces in a point-to-point (e.g., one field device communicatively coupled to a field device bus) or a multi-drop (e.g., a plurality of field devices communicatively coupled to a field device bus) wiring connection arrangements and/or via wireless communications. Some field devices are configured to operate using relatively simple commands and/or communications (e.g., an ON command and an OFF command). Other field devices are more complex and require more commands and/or more communication information, which may include simple commands. For example, some of the more complex field devices may communicate analog values with digital communications superimposed on the analog value using, for example, a Highway Addressable Remote Transducer ("HART") communication protocol. Other field devices can use entirely digital communications (e.g., a FOUNDATION Fieldbus communication protocol).

In a process control system, each field device is typically coupled to a process controller via one or more I/O cards and a respective communication medium (e.g., a two-wire cable, a wireless link, an optical fiber, etc.). In practice, various communication media are often used to communicatively couple a plurality of field devices to a process controller. In situations in which a field device is changed or a different communication protocol is used, the wiring coupling the field device to the I/O card typically has to be re-landed (i.e., the terminated ends of the wires have to be lifted and moved) to a different communication port that is configured for communications using the different communication protocol. In large process control systems, for example, re-landing the wires of a field device can be extremely tedious, time consuming and expensive, particularly when hundreds or thousands of field devices are being switched to communicate using a different communication protocol.

SUMMARY

Example apparatus and methods to communicatively couple field devices to controllers in a process control system are disclosed. An example method of changing a communication protocol of a first field device in a process control system includes decoupling from the first field device a first removable communication module configured to communicate using a first communication protocol. The example method also includes coupling to the first field device a second removable communication module configured to communicate using a second communication protocol. After coupling the second removable communication module, the first field device is configured to communicate using the second communication protocol. In addition, the first field device is coupled to a first communication channel on an input/output card when communicating using the first communication protocol and the first field device is coupled to the first communication channel on the input/output card when communicating using the second communication protocol.

In accordance with another example, an example distributed process control system includes an input/output card having a plurality of communication channels. The example systems also include a first field device having a first communication module removably coupled thereto to communicate using a first communication protocol. The first field device is coupled to a first of the plurality of communication channels. In addition, a second communication module is removably couplable to the first field device to replace the first communication module to communicate using a second communication protocol while the first field device is coupled to the first of the plurality of communication channels.

DETAILED DESCRIPTION

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Figure 1:
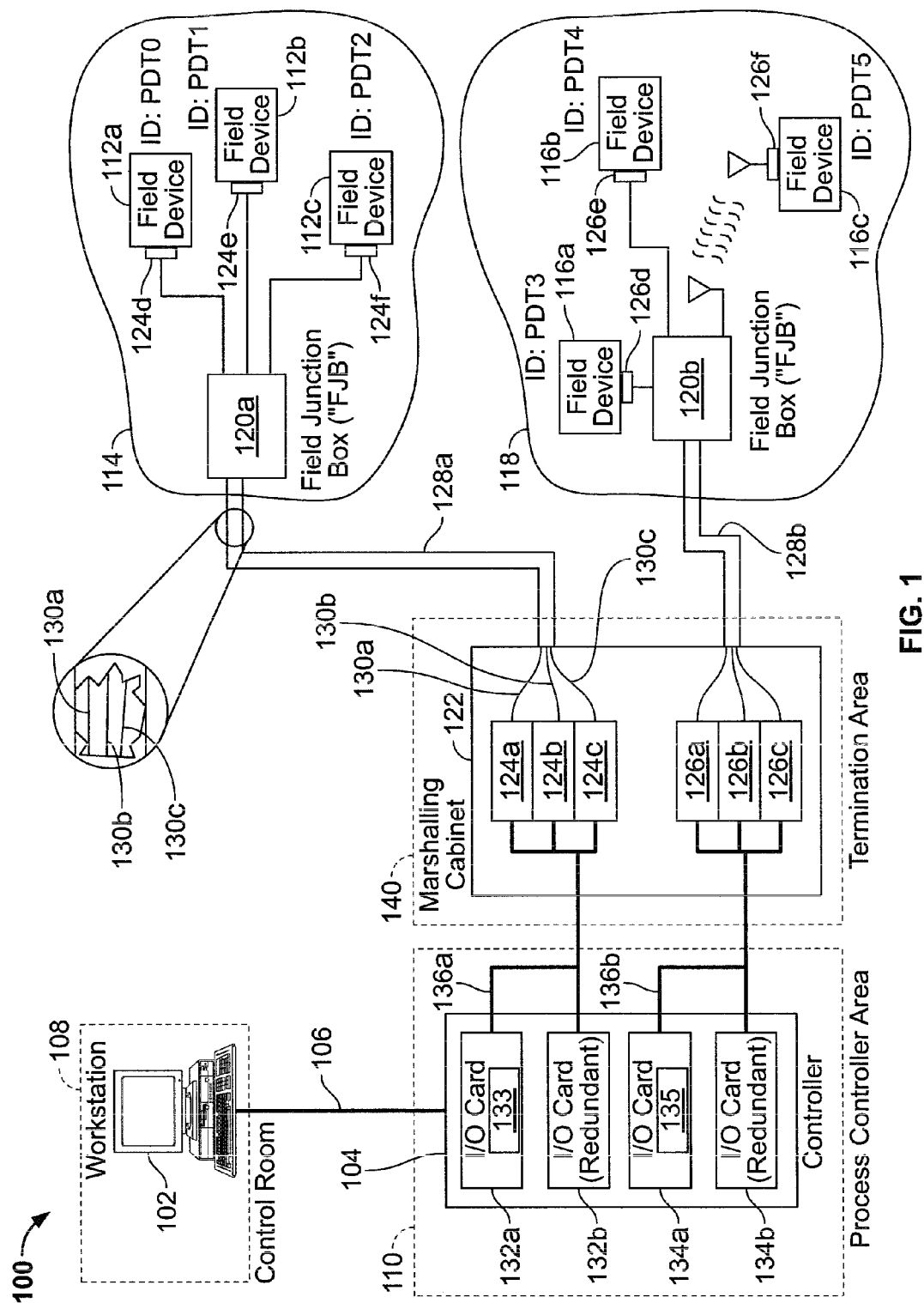
FIG. 1 is a block diagram illustrating an example process control system implementing the example methods and apparatus described herein.

An example process control system includes a control room (e.g., a control room 108 of FIG. 1), a process controller area (e.g. a process controller area 110 of FIG. 1), a termination area (e.g., a termination area 140 of FIG. 1) and one or more process areas (e.g., process areas 114 and 118 of FIG. 1). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environmental conditions (e.g., relatively high temperatures, airborne toxins, unsafe radiation levels, etc.). The control room typically includes one or more workstations within an environment that is safely accessible by humans. The workstations include user applications that users (e.g., engineers, operators, etc.) can access to control operations of the process control system by, for example, changing variable values, process control functions, etc. The process controller area includes one or more controllers communicatively coupled to the workstation(s) in the control room. The controllers automate control of the field devices in the process area by executing process control strategies implemented via the workstation. An example process strategy involves measuring a pressure using a pressure sensor field device and automatically sending a command to a valve positioner to open or close a flow valve based on the pressure measurement. The termination area includes a marshalling cabinet that enables the controllers to communicate with the field devices in the process area. In particular, the marshalling cabinet includes a plurality of termination or communication modules used to marshal, organize or route signals between termination or communication modules coupled to the field devices and one or more I/O cards communicatively coupled to the controllers. The communication modules translate information received from the field devices to a format compatible with the I/O cards and the controllers and translate information from the I/O cards and the controllers to a format compatible with the field devices.

Known techniques used to communicatively couple field devices within a process control system to controllers involve using a separate bus (e.g., a wire or wires, a cable, or a circuit) between each field device and a respective I/O card communicatively coupled to a controller (e.g., a process controller, a programmable logic controller, etc.). An I/O card enables communicatively coupling a controller to a plurality of field devices associated with different data types and/or signal types (e.g., analog input (AI) data types, analog output (AO) data types, discrete input (DI) data types, discrete output (DO) data types, digital input data types, and digital output data types)) and/or different field device communication protocols by translating or converting information communicated between the controller and the field devices. For example, an I/O card may be provided with one or more field device interfaces configured to exchange information with a field device using the field device communication protocol associated with that field device. Different field device interfaces communicate via different channel types (e.g., analog input (AI) channel types, analog output (AO) channel types, discrete input (DI) channel types, discrete output (DO) channel types, digital input channel types, and digital output channel types)). In addition, the I/O card can convert information (e.g., voltage levels, digital values, etc.) received from the field device into process information (e.g., pressure measurement values) that the controller can use to perform operations associated with controlling the field device.

The above-mentioned known techniques typically require a bundle of wires or buses (e.g., a multi-core cable) to communicatively couple a plurality of field devices to I/O cards. In particular, each field device is typically coupled via one or more wires to one or more electrical terminations (e.g., screw terminals) on an I/O card. The I/O card electrical terminations, to which each field device is coupled, are selected to enable the I/O card to communicate with the field device using the communication signals and communication protocol used by the field device. In other words, the wires coupling the field devices to the I/O cards must be landed on or wired to I/O card terminals associated with I/O card channels that use the same types of communication signals and protocols as the field devices. As a result, with these known systems, if it is necessary or desirable to replace a field device with one that employs a different type of communication signal and/or protocol, the wires at the field device terminations have to be removed and coupled to the new device and the I/O card terminations have to be removed and re-landed on I/O card channels (and its terminations) that communicate using the different communication signals and/or protocol. Similarly, if it is necessary or desirable to change the type of communication signal(s) and/or protocol used on the wires coupling a field device to an I/O card (e.g., to increase noise immunity, to increase the rate at which data is conveyed, to comply with new standards or plant requirements, etc.), the wire ends at the field device must typically be un-terminated and re-landed on a replacement field device that uses the desired, different communication signal(s) and/or protocol. Likewise, the wire ends at the I/O card must typically be un-terminated and re-landed on I/O card terminations coupled to a channel that communicates using the desired, different communication signal(s) and/or protocol. Such re-termination or re-landing of field wiring between I/O cards and field devices is time consuming, expensive and error-prone.

Unlike the above-described known systems that rely on the fixed configuration of the channels of an I/O card to determine which wire connection or termination location(s) on the I/O card are used to enable communicating using a communication signal type and protocol of a field device attached thereto, the example apparatus and methods described herein may be used to more flexibly communicatively couple field devices to an I/O card. In particular, the example apparatus and methods described herein use a pair of communication modules, one of which is removably couplable to a field device and the other which is removably couplable to an I/O card. The pair of communication modules provides substantially all of communication software and communications electronic needed to enable the field device to communicate with the I/O card and controller. In this manner, the example communication modules described herein enable a field device to be coupled to an I/O card using any channel of the I/O card, regardless of the communication signal type and/or protocol used by the channel. As a result, as described in greater detail below, the communication signal(s) and/or protocol used by a field device can be changed by removing and replacing the pair of communication modules with a pair of communication modules that use the desired, different communication signal(s) and/or protocol without having to re-terminate or re-land any wires coupling the field device to a controller I/O card. Also, as described in greater detail below, if revised (e.g., upgrade) communications software and/or electronics, including diagnostics, are available for the same type of communication signal(s) and/or protocol used by a field device, the communication modules of the field device and the I/O card can be removed and replaced with communication modules having the revised communications software and/or electronics without having to remove and re-land any wires coupling the field device to a controller I/O card. In addition, as detailed below, when the communication signal(s) and/or protocol of a field device is to be changed, including updated or upgraded, the field device(s) do not have to be replaced. Only the communication modules at the field device and at the I/O card are exchanged for different communication modules that communicate with the different communication signal(s) and/or protocol. Thus, advantageously, all of the field device configuration information such as, for example, tag number, calibration settings, calibration history, span, etc. that is currently stored in the field device(s) is retained.

The example communication modules described herein may be self-contained, encapsulated electronic modules that include communications software. Further, these example communication modules which can be removably inserted or otherwise coupled to field devices of varying types, makes (e.g., provided by different manufacturers) and models or I/O cards (e.g., via marshalling cabinets as described in connection with FIG. 1). The example communication modules may be standardized and used in connection with different types of field devices to provide the communication signal(s) and/or protocol for the field devices. More specifically, the mechanical configuration and interface, including the packaging, electrical connections (e.g., pinout), etc. of the field devices and the I/O card, and the communication modules may be made standard so that any of a number of available communication modules providing different communication protocols, signaling, etc. can be used with any of a variety of field devices, which may be made by any number of manufacturers. Likewise, the manner in which the communication modules communicate with other electronics in the field devices may also be standardized. In other words, the communication schemes used to enable communications between the field devices and the communication modules may also be standardized across types, makes, models, etc. of field devices to further facilitate interchangeability of communication modules with field devices.

The example communication modules described herein can enable field device communications to be standardized, thereby enabling the communication modules to be manufactured without particularity to any one communication signaling or protocol. Instead, such communication signaling or protocols can be assigned or configured by installing an appropriate communication module in a field device post-manufacture of the field device (e.g., when the field device is installed in a process control system or during commissioning). This reduces the number of spare components (e.g., spare field devices) needed and facilitates easy conversion of field devices from one communication protocol or protocol version to another. The example methods and apparatus described herein also simplify the manufacture of field devices and I/O cards because the field devices and the I/O cards may no longer have to include substantial amounts of internal communications protocol electronics or software. Thus, the example methods and apparatus described herein eliminate the need for manufacturers to produce as many similar field devices employing different communications signaling or protocols. In addition, manufacturers do not have to produce I/O cards that including a certain number or configuration of channels using different communications signaling or protocols.

Further, system maintenance costs may be reduced because communications software revisions or upgrades may be easily added by replacing a communication module with another communication module having the revised or upgraded software including software that incorporates new or different features. Still further, because the example communication module described herein can be easily exchanged or replaced without having to access the internal electronics of a field device or I/O card, upgrades and/or alterations of a communication protocol can be performed in situ (i.e., without having to remove and re-terminate or re-land wires at the field device). Additionally, diagnostics of a field device may be included in a communication module and, thus, customers desiring newer or better diagnostic software can exchange a communication module for another communication module containing the desired diagnostics without having to change the communication protocol and/or internal electronics of the field device. Furthermore, some example communication modules may include local tagging information such as, for example, field device serial number(s) and/or other field device information. The inclusion of any or all of the communications signaling or protocols, software, diagnostic information and/or local tagging information in the example communication modules facilitates configuration of field devices and evaluation field device operating conditions, history, maintenance needs, etc.

In addition, in some examples, the communication modules may be coded, e.g., color coded, in accordance with the type of communication signal(s) and/or protocol, upgrades, updates, diagnostics, etc. included therein. The coding scheme facilitates identification of the proper communication modules for coupling to the field device(s) and/or I/O card(s).

The example apparatus and methods described herein involve using an example universal internal I/O bus (e.g., a common or shared analog or digital communication bus) that communicatively couples one or more first communication modules to one or more I/O cards communicatively coupled to a controller. Each first communication module is coupled to a respective second communication module using a respective external bus (e.g., an analog or a digital bus). The second communication modules are communicatively coupled to one or more respective field devices using a respective internal field device bus (e.g., an analog bus or a digital bus internal to each field device), which may be standardized across different types, makes, models, etc. of field devices. Throughout this description the term "communication module(s)" may refer to the communication module(s) associated with an I/O card, to communication module(s) associated with a field device and/or to any type of communication module(s) regardless of location. The designations of "first," "second," "other," "another," "complimentary," etc. are not meant to restrictively reference a specific communication module in a specific location in the examples described herein. Rather, these terms are used to differentiate different communication modules in the described examples.

The communication modules removably coupled to field devices are configured to receive field device information from the field devices via the internal field device buses and communicate the field device information to other communication modules, which are associated with one or more I/O cards, via the external bus. These other communication modules communicate the field device information to the controller I/O cards via their internal I/O busses by, for example, packetizing the field device information and communicating the packetized information to the I/O cards. The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multidrop bus connection, point-to-point connection, etc.), field device bus or segment identification information (e.g., field device bus or field device segment via which a field device is communicatively coupled to communication module), field device data type information (e.g., a data type descriptor indicative of the data type used by a particular field device) and/or other diagnostic information. The I/O card(s) can extract the field device information received via the internal I/O bus and communicate the field device information to a controller, which can then communicate some or all of the information to one or more workstation terminals for subsequent analysis.

To communicate field device information (e.g., commands, instructions, queries, threshold activity values (e.g., threshold PV values), etc.) from workstation terminals to field devices, I/O cards can packetize the field device information and communicate the packetized field device information to a plurality of communication modules over the internal I/O bus. Each of the communication modules can then extract or depacketize field device information from the packetized communications received from an I/O card and communicate the field device information to a corresponding communication module removably coupled to a field device.

Now turning in detail to FIG. 1, an example process control system 100 includes a workstation 102 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP, SOAP, etc.). The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in the control room 108 and the controller 104 is located in the process controller area 110 separate from the control room 108.

In the illustrated example, the example process control system 100 includes field devices 112*a-c* in the first process area 114 and field devices 116*a-c* in the second process control area 118. To communicate information between the controller 104 and the field devices 112*a-c* and 116*a-c*, the example process control system 100 is provided with field junction boxes (FJB's) 120*a-b* and a marshalling cabinet 122. Each of the field junction boxes 120*a-b* routes signals from respective ones of the field devices 112*a-c* and 116*a-c* to the marshalling cabinet 122. The marshalling cabinet 122, in turn, marshals (e.g., organizes, groups, etc) information received from field devices 112*a-c* and 116*a-c* and routes the field device information to respective I/O cards (e.g., I/O cards 132*a-b* and 134*a-b*) of the controller 104. In the illustrated example, the communications between the controller 104 and the field devices 112*a-c* and 116*a-c* are bidirectional so that the marshalling cabinet 122 is also used to route information received from I/O cards of the controller 104 to respective ones of the field devices 112*a-c* and 116*a-c* via the field junction boxes 120*a-b*. In the illustrated example, first communication modules 124*a-c* and 126*a-c* are included in the marshalling cabinet 122, and second communication modules 124*d-f* and 126*d-f* are coupled to the field devices 112*a-c* and 116*a-c*, respectively.

In the illustrated example, the field devices 112*a-c* are communicatively coupled to the second communication modules 124*d-f* and to the field junction box 120*a* via electrically conductive, wireless, and/or optical communication media, and the field devices 116*a-c* are communicatively coupled to the second communication modules 126*d-f* and to the field junction box 120*b* via electrically conductive (e.g., hardwired), wireless, and/or optical communication media. For example, the field junction boxes 120*a-b* may be provided with one or more wired, wireless, and/or optical data transceivers to communicate with wired, wireless, and/or optical transceivers of the second communication modules 124*d-f* and 126*d-f*. In the illustrated example, the field junction box 120*b* is communicatively coupled wirelessly to the second communication module 126*f* and the field device 116*c*. In an alternative example implementation, the marshalling cabinet 122 may be omitted and signals from the second communication modules 124*d-f* and 126*d-f* of the field devices 112*a-c* and 116*a-c* can be routed from the field junction boxes 120*a-b* directly to the first communication modules 124*a-c* and 126*a-c*, which may be removably coupled to the I/O cards 132*a-b* and 134*a-b* of the controller 104 without intervening structure (i.e., without the marshalling cabinet 122). In yet another example implementation, the field junction boxes 120*a-b* may be omitted and the second communication modules 124*d-f* and 126*d-f* of the field devices 112*a-c* and 116*a-c* can be directly coupled to the first communication modules 124*a-c* and 126*a-c* of the marshalling cabinet 122.

The field devices 112*a-c* and 116*a-c* may be Fieldbus compliant valves, actuators, sensors, etc., in which case the field devices 112*a-c* and 116*a-c* communicate via a digital data bus using the well-known FOUNDATION Fieldbus communication protocol. Of course, other types of field devices and communication protocols could be used instead. For example, the field devices 112*a-c* and 116*a-c* could instead be Profibus, HART, or AS-i compliant devices that communicate via the data bus using the well-known Profibus and HART communication protocols. In some example implementations, the field devices 112*a-c* and 116*a-c* can communicate information using analog communications or discrete communications instead of digital communications. In addition, the communication protocols can be used to communicate information associated with different data types.

Each of the field devices 112*a-c* and 116*a-c* is configured to store field device identification information. The field device identification information may be a physical device tag (PDT) value, a device tag name, an electronic serial number, etc. that uniquely identifies each of the field devices 112a-c and 116a-c. In the illustrated example of FIG. 1, the field devices 112a-c store field device identification information in the form of physical device tag values PDT0-PDT2 and the field devices 116a-c store field device identification information in the form of physical device tag values PDT3-PDT5. The field device identification information may be stored or programmed in the field devices 112a-c and 116a-c by a field device manufacturer and/or by an operator or engineer involved in installation and/or commissioning of the field devices 112a-c and 116a-c.

To route information associated with (e.g., collected by) the field devices 112a-c and 116a-c to the process controller area 110, the system 100 includes the plurality of communication modules 124a-f and 126a-f, as noted above. The communication modules 124a-f are configured to marshal information associated with the field devices 112a-c in the first process area 114, and the communication modules 126a-f are configured to marshal information associated with the field devices 116a-c in the second process area 118.

As shown, the communication modules 124a-c and 126a-c are communicatively coupled to the field junction boxes 120a-b via respective multi-conductor cables 128a and 128b (e.g., a multi-bus cable). In an alternative example implementation in which the marshalling cabinet 122 is omitted, the communication modules 124a-c and 126a-c can be installed in respective ones of the field junction boxes 120a-b.

The illustrated example of FIG. 1 depicts a point-to-point configuration in which each conductor or conductor pair (e.g., bus, twisted pair communication medium, two-wire communication medium, etc.) in the multi-conductor cables 128a-b communicates information uniquely associated with a respective one of the field devices 112a-c and 116a-c via the associated communication modules 124d-f and 126d-f. For example, the multi-conductor cable 128a includes a first conductor 130a, a second conductor 130b, and a third conductor 130c. Specifically, the first conductor 130a is used to form a first data bus configured to communicate information between the first communication module 124a and the second communication module 124d associated with the field device 112a, the second conductor 130b is used to form a second data bus configured to communicate information between the first communication module 124b and the second communication module 124e associated with the field device 112b, and the third conductor 130c is used to form a third data bus configured to communicate information between the first communication module 124c and the second communication module 124e associated with the field device 112c.

In an alternative example implementation using a multi-drop wiring configuration, each of the first communication modules 124a-c and 126a-c can be communicatively coupled with one or more second communication modules associated with other field devices. For example, in a multi-drop configuration, the communication module 124a can be communicatively coupled via the first conductor 130a to the second communication module 124d associated with the field device 112a and to another communication module associated with another field device (not shown). In some example implementations, a communication module can be configured to communicate wirelessly with a plurality of field devices using a wireless mesh network.

As described in more detail below, the second communication modules 124d-f and 126d-f are communicatively coupled directly to the field devices 112a-c and 116a-c as, for example, a removably pluggable or insertable device having a charm-like form (e.g., a circuit card having a protective cover or housing and a pluggable electrical connector). In an alternative example implementation, the second communication modules 124d-f and 126d-f may be communicatively coupled to the field devices 112a-c and 116a-c via intermediate structure(s) or device(s). Likewise, the first communication modules 124a-c and 126a-c are communicatively coupled directly to the marshalling cabinet 122 (alternatively, to the I/O cards 132a-b and 134a-b) as, for example, a removably pluggable or insertable device having a charm-like form (e.g., a circuit card having a protective cover or housing and a pluggable electrical connector). However, in an alternative example implementation, the first communication modules 124a-c and 126a-c may be communicatively coupled to the marshalling cabinet 122 and/or I/O cards 132a-b, 134a-b via intermediate structure(s) or device(s).

Each of the communication module pairs may be configured to communicate using a different communication protocol and/or data type. For example, the first communication module 124a may include an external bus interface to communicate with the second communication module 124d of the field device 112a using digital data while the first communication module 124b may include an analog external bus interface to communicate with the second communication module 124e of the field device 112b using analog data.

To control I/O communications between the controller 104 (and/or the workstation 102) and the field devices 112a-c and 116a-c, the controller 104 is provided with the plurality of I/O cards 132a-b and 134a-b. In the illustrated example, the I/O cards 132a-b are configured to control I/O communications between the controller 104 (and/or the workstation 102) and the field devices 112a-c in the first process area 114, and the I/O cards 134a-b are configured to control I/O communications between the controller 104 (and/or the workstation 102) and the field devices 116a-c in the second process area 118.

In the illustrated example of FIG. 1, the I/O cards 132a-b and 134a-b reside in the controller 104. To communicate information from the field devices 112a-c and 116a-c to the workstation 102, the I/O cards, 132a-b and 134a-b communicate the information to the controller 104 which, in turn, communicates the information to the workstation 102. Similarly, to communicate information from the workstation 102 to the field devices 112a-c and 116a-c, the workstation 102 communicates the information to the controller 104, the controller 104 communicates the information to the I/O cards 132a-b and 134a-b, and the I/O cards 132a-b and 134a-b communicate the information to the field devices 112a-c and 116a-c via the first communication modules 124a-c and 126a-c and the second communication modules 124d-f and 126d-f. In an alternative example implementation, the I/O cards 132a-b and 134a-b can be communicatively coupled to the LAN 106 internal to the controller 104 so that the I/O cards 132a-b and 134a-b can communicate directly with the workstation 102 and/or the controller 104.

To provide fault tolerant operations in the event that either of the I/O cards 132a and 134a fails, the I/O cards 132b and 134b are configured as redundant I/O cards. That is, if the I/O card 132a fails, the redundant I/O card 132b assumes control and performs the same operations as the I/O card 132a would otherwise perform. Similarly, the redundant I/O card 134b assumes control if the I/O card 134a fails.

By providing the second or field device communication modules 124a-f, 126a-f, which can be configured to use different data type interfaces to communicate between the field devices 112a-c, 116a-c and the I/O cards 132a-b, 134a-b, the illustrated example of FIG. 1 enables routing data associated with different field device data types (e.g., the data types or channel types used by the field devices 112a-c and 116a-c) to the I/O cards 132a-b and 134a-b without having to implement a plurality of different field device interface types for different communication signaling and/or protocols on the I/O cards 132*a-b* and 134*a-b*. Therefore, an I/O card having one interface type (e.g., an internal I/O bus interface type for communicating via an internal I/O bus 136*a* and/or an internal I/O bus 136*b*) can communicate with a plurality of field devices using different field device communication signaling and/or protocols, as defined by the first or I/O communication modules 124*a-b* and 126*a-b*.

In the illustrated example, the marshalling cabinet 122, the communication modules 124*a-f* and 126*a-f*, the I/O cards 132*a-b* and 134*a-b*, and the controller 104 facilitate migrating existing process control system installations to a configuration substantially similar to the configuration of the example process control system 100 of FIG. 1. For example, because the communication modules 124*a-f* and 126*a-f* can be configured to include any suitable interface type, the communication modules 124*a-f* and 126*a-f* can be configured to be communicatively coupled to any type of field device. Similarly, the controller 104 can be configured to include a known LAN interface to communicate via a LAN to an already installed workstation. In some example implementations, the I/O cards 132*a-b* and 134*a-b* can be installed in or communicatively coupled to known controllers so that controllers already installed in a process control system need not be replaced.

In an alternative example, a single communication module may communicatively couple a field device, which has standardized protocols, with an I/O card. The communication module may use the communication signaling and protocol of the I/O channel to which the communication module is attached. In such an example, the communication protocol of a field device may be changed by replacing the communication module with a communication module that uses a different communication protocol and re-landing a bus coupled to the communication module to a different channel on the I/O card that uses the desired communication protocol. This example enables field devices to communicate using different protocols without requiring a replacement of the field device itself. Thus, the communication modules can be configured to be removably, communicatively coupled to existing field devices already installed in a process control system.

In yet another alternative example, a single communication module may be communicatively coupled between an I/O card and a field device having multiple communication ports. The multiple ports may include, for example, a standardized port, a HART port, a FOUNDATION Fieldbus port, etc. In this example, the communication protocol of a field device can be changed by replacing the communication module with a communication module that uses a different communication protocol and coupling the replacement communication module to the corresponding port on the field device. This example enables field devices to communicate using different protocols without requiring a replacement of the field device itself. Thus, in this example, the communication modules can be configured to be communicatively coupled to existing field devices already installed in a process control system.

Returning to the illustrated example of FIG. 1, the I/O card 132*a* includes a data structure 133 and the I/O card 134*a* includes a data structure 135. The data structure 133 stores the field device identification numbers (e.g., field device identification information) or other information corresponding to field devices (e.g., the field devices 112*a-c*) that are coupled to the I/O card 132*a* via the internal I/O bus 136*a* and the data structure 135 stored information corresponding to the field devices 116*a-c*. The field device identification numbers or other information stored in the data structure 133 may be used for identification or other purposes or other types of information corresponding to field devices that is transmitted to the workstation (e.g., the workstation 102). The data structures 133 and 135 can be populated by engineers, operators, and/or users via the workstation 102 during a configuration, commissioning or operation of the example process control system 100. The data structures 133 and 135 may also be populated automatically after a field device is coupled to the internal I/O buses 136*a-b*. Although not shown, the redundant I/O card 132*b* stores a data structure identical to the data structure 133 and the redundant I/O card 134*b* stores a data structure identical to the data structure 135. Additionally or alternatively, the data structures 133 and 135 can be stored in the workstation 102.

Figure 2:
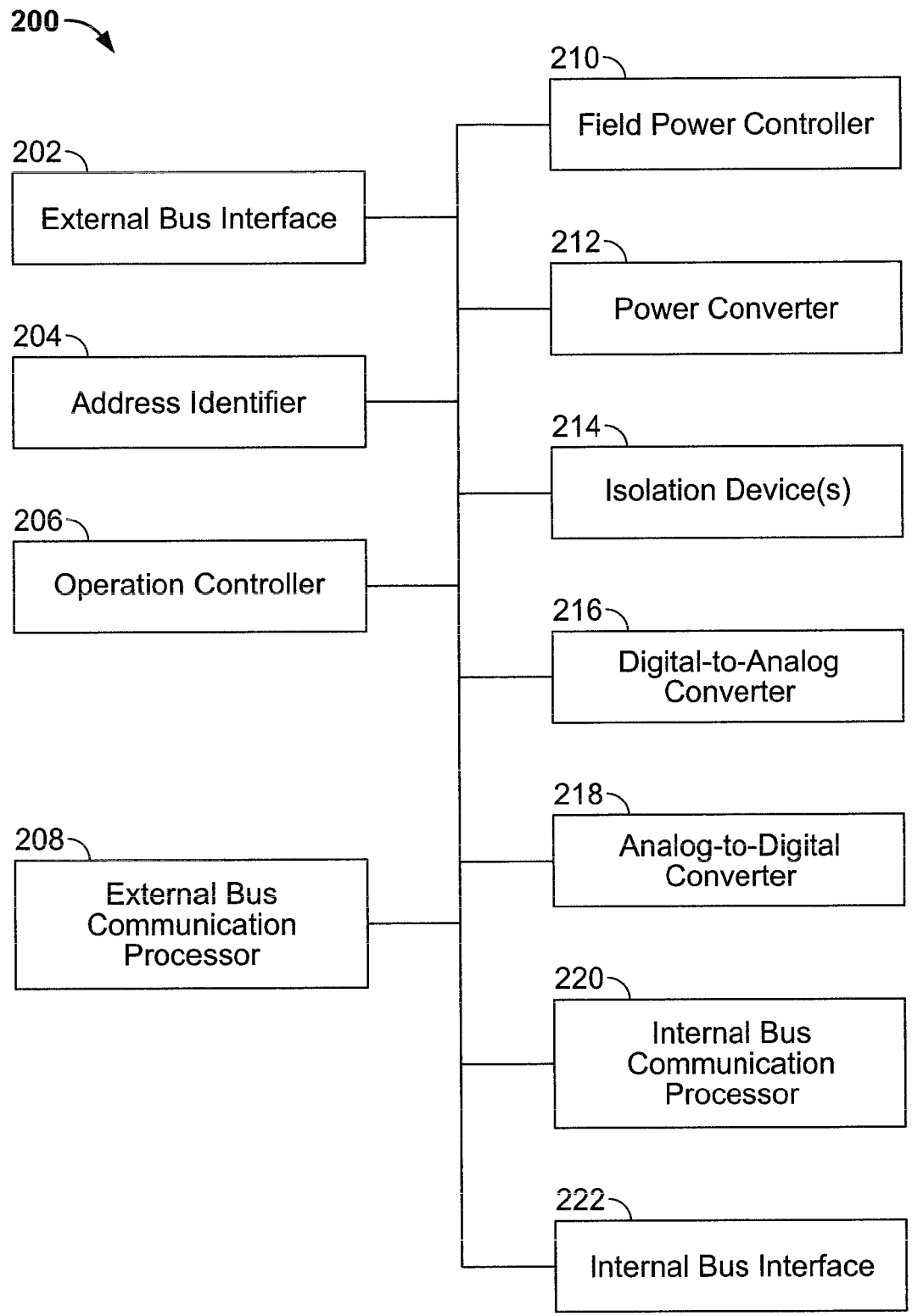
FIG. 2 is a detailed block diagram of an example communication module of FIG. 1.

FIG. 2 shows an example implementation of a communication module 200, which may represent any of the example communication modules described herein. The example communication module 200 of FIG. 2 includes an external bus interface 202 to enable the communication module 200 to communicate with, for example, a complimentary or corresponding communication module. For example, the communication modules 124*a* and 124*d* use respective the external bus interfaces 202 to communicate with each other.

To identify an address of the communication module, an address of an I/O card and/or an address of a field device, the communication module 200 is provided with an address identifier 204. The address identifier 204 may be configured to query an I/O card or a field device for a communication module address (e.g., a network address) when the communication module 200 is plugged into an I/O card or a field device. In this manner, the communication module 200 can use the communication module address as a source and/or destination address when communicating information between the I/O card and the field device.

To control the various operations of the communication module 200, the communication module 200 is provided with an operation controller 206. In an example implementation, the operation controller 206 can be implemented using a microprocessor or a microcontroller. The operation controller 206 communicates instructions or commands to other portions of the communication module 200 to control the operations of those portions.

The example communication module 200 is also provided with an external bus communication processor 208 to exchange information with other communication modules, via an external bus (e.g., the external busses 130*a-c* of FIG. 1). In the illustrated example, the external bus communication processor 208 packetizes information for transmission to another communication module and depacketizes information received from the other communication module. The packetized information is communicated to the external bus interface 202 for transmission over an external bus. In the illustrated example, the external bus communication processor 208 generates header information for each packet to be transmitted and reads header information from received packets. Example header information includes a destination address (e.g., a network address of an I/O card), a source address (e.g., the network address of the communication module 200), a packet type or data type (e.g., analog field device information, field device information, command information, temperature information, real-time data values, etc.), and error checking information (e.g., cyclical-redundancy-check (CRC) information). In some example implementations, the external bus communication processor 208 and the operation controller 206 may be implemented using the same microprocessor or microcontroller.

To control the amount of power provided to a field device to which the communication module 200 is coupled, the communication module 200 is provided with a field power controller 210. In the illustrated example, the power supply (e.g., a power supply 514 of FIG. 5), which may be for example, in the marshalling cabinet 122 or associated with a field device, provides electrical power to the communication module 200 to power a communication channel interface to communicate with the field device. For example, some field devices communicate using 12 volts and others communicate using 24 volts. In the illustrated example, the field power controller 210 is configured to condition, regulate, and step up and/or step down the electrical power provided to the communication module 200 by an external power supply. In some example implementations, the field power controller 210 is configured to limit the amount of electrical power used to communicate with field devices and/or delivered to the field devices to substantially reduce or eliminate the risk of sparking in flammable or combustible environments.

To convert electrical power received from a power supply to electrical power for the communication module 200, the communication module 200 is provided with a power converter 212. In the illustrated example, the circuitry used to implement the communication module 200 uses one or more voltage levels (e.g., 3.3 V) that are different from the voltage levels required by the field device to which the communication module 200 is coupled. The power converter 212 is configured to provide the different voltage levels for the communication module 200 to communicate with the field device using the power received from the power supply. In the illustrated example, the electrical power outputs generated by the power converter 212 are used to power the communication module 200 and the field device coupled thereto and to communicate information between the communication module 200 and the field device via another communication module. Some field device communication protocols require relatively higher or lower voltage levels and/or electrical current levels than other communication protocols. In the illustrated example, the field power controller 210 controls the power converter 212 to provide the voltage level(s) to power the field device and to communicate with the field device.

To electrically isolate the circuitry of the communication module 200 from the field device and/or the I/O card to which the communication module 200 is coupled, the communication module 200 is provided with one or more isolation device(s) 214. The isolation device(s) 214 may be implemented using galvanic isolators and/or optical isolators. An example isolation configuration is described in detail below in connection with FIG. 5.

To convert between analog and digital signals, the communication module 200 is provided with a digital-to-analog converter 216 and an analog-to-digital converter 218. The digital-to-analog converter 216 is configured to convert digitally represented values (e.g., measurement values) or information received from a field device, an I/O card and/or another communication module to analog values or information for further communication in a system (e.g., the process control system 100 of FIG. 1). Likewise, the analog-to-digital converter 218 is configured to convert analog values (e.g., measurement values) or information received from a field device, an I/O card and/or another communication module to digitally represented values or information for further communication in a system (e.g., the process control system 100 of FIG. 1). In an alternative example implementation in which the communication in the system is entirely digital and/or entirely analog, the digital-to-analog converter 216 and/or the analog-to-digital converter 218 may be omitted from the communication module 200.

To control communications with an I/O card and/or a field device to which the communication module 200 is coupled, the communication module 200 is provided with an internal bus communication processor 220. The internal bus communication processor 220 ensures that information received from another communication module and, thus, from a field device and/or an I/O card, is in the correct format and voltage type (e.g., analog or digital) to be communicated to the I/O card and/or the field device to which the communication module 200 is coupled. The internal bus communication processor 220 is also configured to packetize or depacketize information if the I/O card and/or the field device to which the communication module 200 is coupled if configured to communicate using digital information. In addition, the internal bus communication processor 220 is configured to extract information received from an I/O card and/or a field device and communicate that information to the analog-to-digital converter 218 and/or to the external bus communication processor 208 for subsequent communication to another communication module and, thus, a field device and/or an I/O card.

The example communication module 200 is also provided with an internal interface 222 (FIGS. 2 and 3) configured to communicatively couple the communication module 200 to I/O cards (e.g., the I/O cards 132a-b of FIG. 1 or with any other I/O cards) and/or to a field device (e.g., the field device 112a of FIG. 1 or with any other field devices). For example, the information packetized by the internal bus communication processor 220 is communicated to the internal interface 222 for transmission over an internal bus (e.g., the internal busses 136a-b of FIG. 1) to an I/O card and/or to a field device to which the communication module 200 is coupled.

In the illustrated example, the internal bus communication processor 220 is also configured to timestamp information received from an I/O card, a field device or the other communication module. Generating timestamps at the communication module 200 facilitates implementing sequence of events (SOE) operations using timestamp accuracies in the sub-millisecond range. For example, the timestamps and respective information can be communicated to the controller 104 and/or the workstation 102. Sequence of events operations performed by, for example, the workstation 102 (FIG. 1) (or any other processor system) can then be used to analyze what happened before, during, and/or after a particular state of operation (e.g., a failure mode) to determine what caused the particular state of operation to occur. Timestamping in the sub-millisecond range also enables capturing events using relatively higher granularity. In some example implementations, the internal bus communication processor 220 and the operation controller 206 can be implemented using the same microprocessor or microcontroller.

In general, internal communication processors similar to the internal bus communication processor 220 are provided with communication protocol functions or other communication functions (e.g., Fieldbus communication protocol functions, HART communication protocol functions, etc.) corresponding to the type of field device and/or I/O channel with which they are configured to communicate. For example, if the I/O channel associated with internal I/O bus 136a is configured to use the HART communication protocol, the internal communication controller 220 of the communication module 124a is provided with HART communication protocol functions. When the communication module 124a receives information from the I/O card 132a intended for the second communication module 124d and thus, the field device 112a, the internal communication processor 220 formats the information in accordance with the HART communication protocol and delivers the information to the second communication module 124d and the field device 112a. If the second communication module 124d does not communicate using the HART communication protocol, the second communication module 124d may be removed and replaced with another communication module that is configured to implement the HART protocol. Thus, the field device 112a can be modified to communicate using a different protocol to match that of the I/O bus 136a, thereby eliminating the need to re-land or re-terminate the internal I/O bus 136a at the I/O card 132a.

In the illustrated example, the internal bus communication processor 220 is configured to process pass-through messages. Pass-through messages originate at a workstation (e.g., the workstation 102 of FIG. 1) and are communicated as payload (e.g., the data portion of a communication packet) through a controller (e.g., the controller 104 of FIG. 1) to a communication module (e.g., the communication module 124a of FIG. 1) for delivery to a field device (e.g., the field device 112a, via the second communication module 124d). For example, a message originating at the workstation 102 and intended to be delivered to the field device 112a is tagged at the workstation 102 with a communication protocol descriptor (e.g., a HART protocol descriptor) and/or is formatted in accordance with a communication protocol of the field device 112a. The workstation 102 then wraps the message into a payload(s) of one or more communication packets to deliver the message from the workstation 102, through the I/O controller 104 to the communication module 124a as a pass-through message. Wrapping the message involves, for example, packetizing the message with header information in accordance with a communication protocol (e.g., a Fieldbus protocol, a HART protocol, etc.) used to communicate with the field devices.

When the communication module 124a receives the communication packet(s) containing the pass-through message from the I/O card 132, the internal bus communication processor 220 (FIG. 2) extracts the payload(s) from the received communication packet(s). The external bus communication controller 208 (FIG. 2) then unwraps the pass-through message from the payload(s), formats the message in accordance with the communication protocol descriptor generated by the workstation 102 (if not already formatted at the workstation 102), and communicates the message to the field device 112a, via the second communication module 124d.

Alternatively, the message may be passed without modification from the first communication module 124a to the second communication module 124d. Then the second communication module 124d unwraps the pass-through message from the payload(s), formats the message in accordance with the communication protocol descriptor generated by the workstation 102 (if not already formatted at the workstation 102), and communicates the message to the field device 112a.

The internal communication processor 220 is also configured to communicate pass-through messages to the workstation 102 in a similar manner. For example, if the field device 112a generates a message (e.g., a response to the workstation message or any other message) intended to be delivered to the workstation 102, the internal bus communication processor 220 wraps the message from the field device 112a into the payload of one or more communication packets and the external bus communication processor 208 communicates the one or more packets containing the wrapped message to the first communication module 124a and to the I/O card 132a. When the workstation 102 receives the packets from the controller 104 containing the wrapped message, the workstation 102 can unwrap and process the message.

Figure 3:
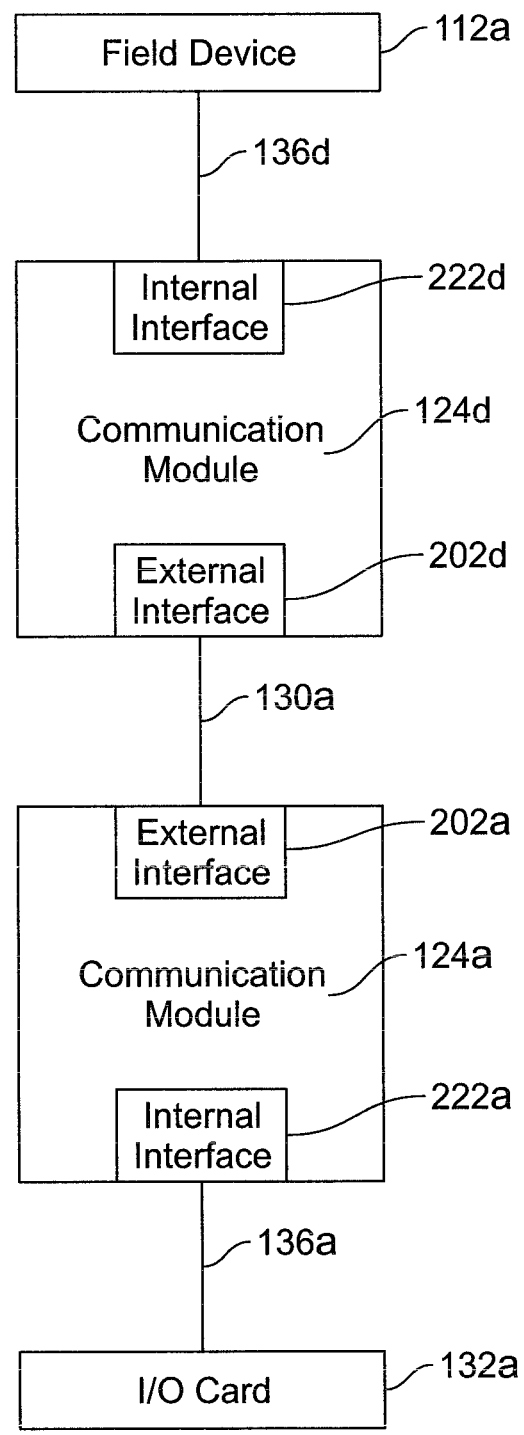
FIG. 3 is block diagram illustrating an example electrical connection of two example communication modules, an example field device and an example I/O card of FIG. 1.

FIG. 3 is a block diagram illustrating an example electrical connection of two example communication modules, an example field device and an example I/O card. In this example the communication modules 124a,d are illustrated. However, any other communication modules may be coupled to any other communication module, I/O card and/or field device in the same or a similar manner. In addition, the I/O card 132a and the field device 112a are illustrated in this example, but any other I/O card and/or field device may be may be coupled to any other communication module in the same or a similar manner. As shown in FIG. 3, the I/O card 132a is communicatively coupled to a first internal interface 222a of the first communication module 124a via the internal I/O bus 136a. From a first external interface 202a, a conductor or bus 130a couples the first communication module 124a to a second external interface 202d of the second communication module 124d. The second communication module 124d is coupled, via a second internal interface 222d and an internal field device bus 136d, to the field device 112a.

Figure 4:
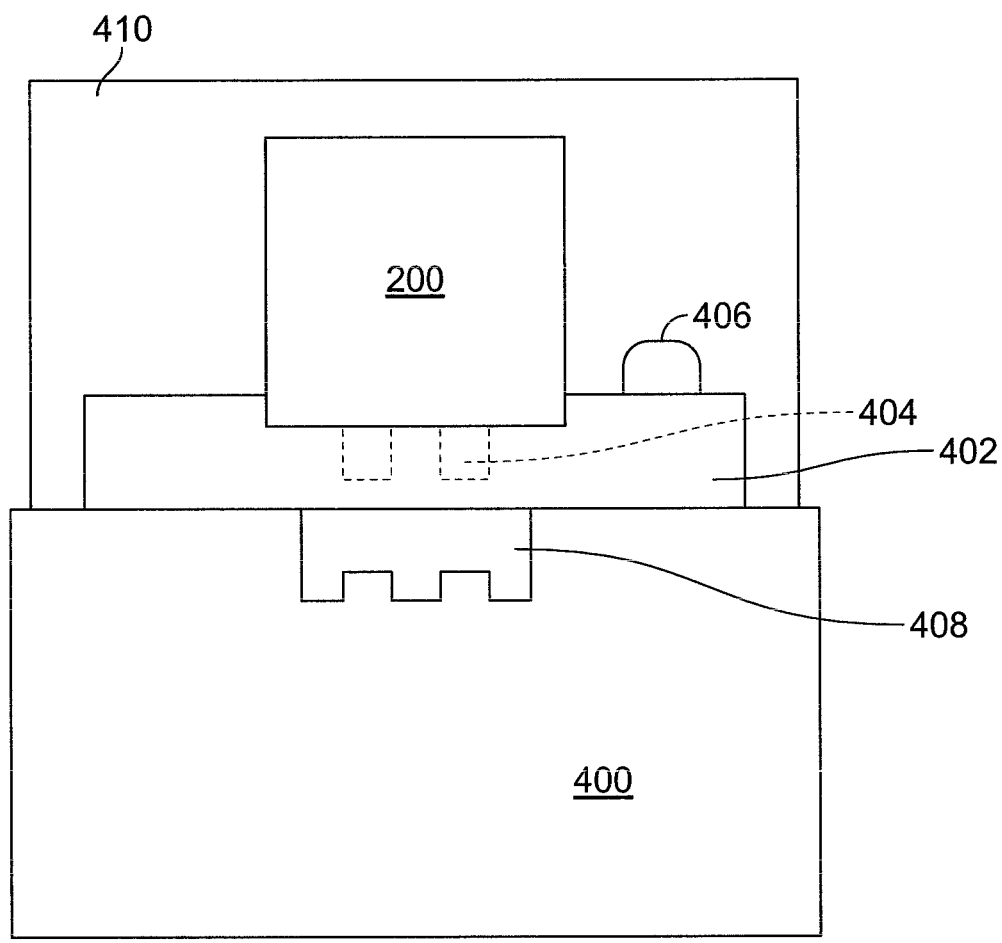
FIG. 4 is a block diagram illustrating an example mechanical connection of an example communication module and an example field device of FIG. 1.

FIG. 4 shows an example mechanical connection of the example communication module 200 and an example field device 400, which may represent any of the example communication modules and/or field devices described herein. In the illustrated example, the example communication module 200 includes one or more contacts 404 (e.g., pins, tabs, traces, etc.) that communicatively couple and/or electrically couple the communication module 200 to the field device 400. In this example, the communication module 200 is coupled to the field device 400 via an intervening base 402. The base 402 is provided with fasteners 406 (e.g., screws), which may be, for example, a field device interface, to tie down, terminate or secure conductive communication media (e.g., wire ends) from an I/O bus. When the communication module 200 is removably coupled to the base 402, the fasteners 406 are communicatively coupled to one or more of the contacts 404 to enable conveying of signals and communicating information between the communication module 200, the field device 400 and an I/O card. In other example implementations, the base 402 may be provided with any other suitable type of field device interface (e.g., a socket) instead of fasteners 406.

To communicatively couple the communication module 200 to the field device 400, the base 402 is provided with a field device contact or connector 408. When a user plugs the base 402 into the field device 400, the field device connector 408 engages an internal bus of the field device 400. The field device connector 408 may be implemented using any suitable interface including a relatively simple interface such as, for example, a punch block. To enable communicating information between the communication module 200 and the field device 400, the field device connector 408 is connected to one or more of the contacts 404 of the communication module 200.

In the illustrated example, the communication module 200 also includes a cover 410, which may be used to shield the communication module 200 and/or the connection of the communication module 200 and the field device 400 from the surrounding environment. The cover 410 prevents moisture and/or other adverse or otherwise potentially damaging environmental conditions from having a harmful effect on the communication module 200 in process areas that may experience those conditions. The cover 410 may be made of any suitable plastic, metal or other material suitable to seal or otherwise protect the communication module 400.

Figure 5:
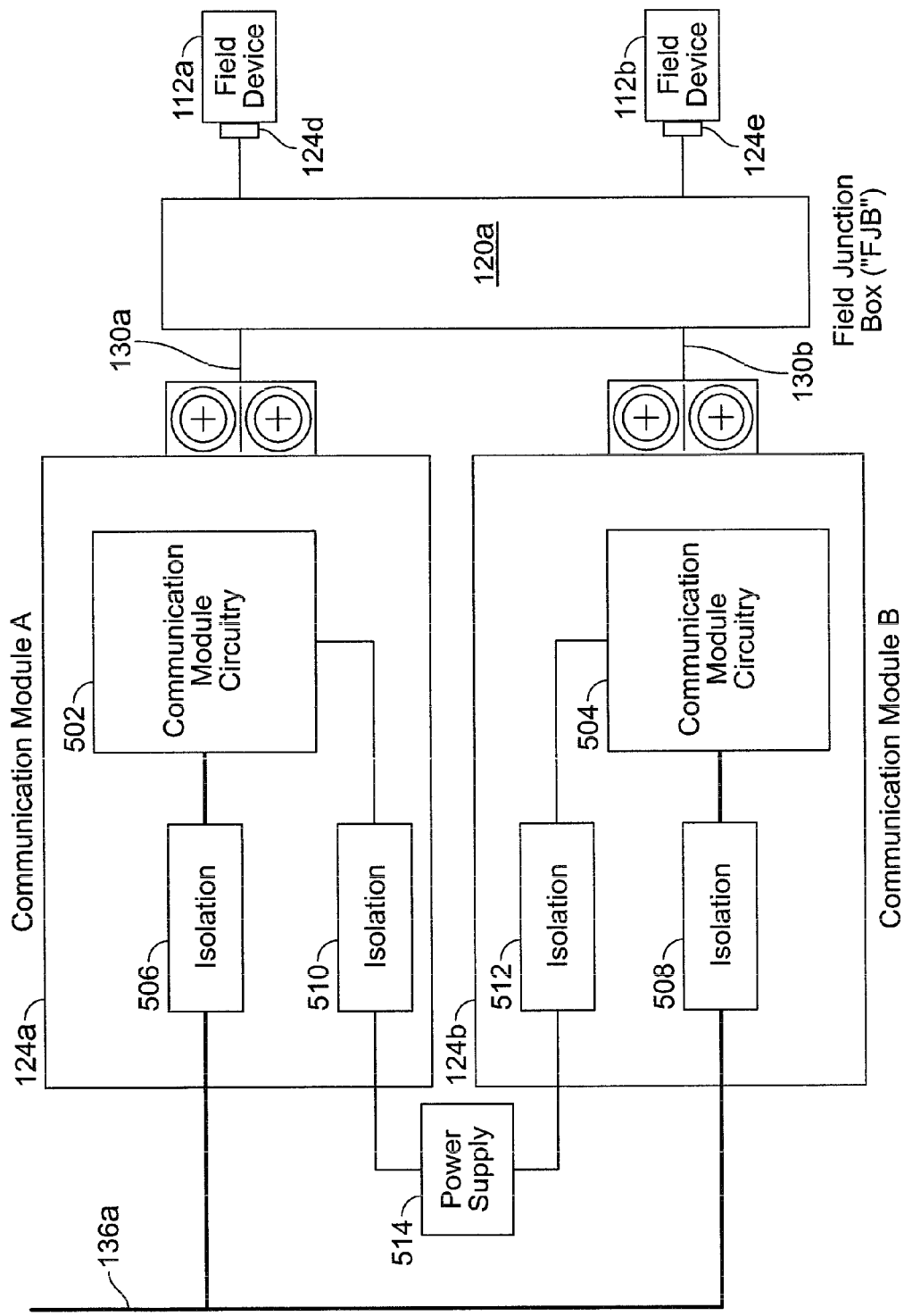
FIG. 5 depicts an isolation circuit configuration that may be implemented in connection with the example communication modules of FIG. 1 to electrically isolate the communication modules from field devices and from communication buses.

FIG. 5 depicts an isolation circuit configuration that may be implemented in connection with the example communication modules 124a-b of FIG. 1 to electrically isolate the communication modules 124a-b from one another and the field devices 112a-b from the internal I/O bus 136a. In this example communication modules 124a-b are illustrated, however, any other communication module may be coupled to any other communication module, I/O card and/or field device in the same or a similar manner. In the illustrated example, each of the communication modules 124a-b includes respective communication module circuitry 502 and 504 (e.g., one or more of the blocks described above in connection with FIG. 2). In addition, the communication modules 124a-b are connected to their respective field devices 112a-b via the field junction box 120a and complimentary communication modules 124d-e. Also, the communication modules 124a-b are connected to the internal I/O bus 136a and a power supply 514.

To electrically isolate the communication module circuitry 502 from the internal I/O bus 136a, the communication module 124a is provided with an isolation circuit 506. In this manner, the communication module circuitry 502 can be configured to follow (e.g., float) the voltage level of the field device 112a if power surges or other power variations occur in the field device 112a without affecting the voltage of the internal I/O bus 136a and without causing damage to the I/O card 132a (FIG. 1). The communication module 124b also includes an isolation circuit 508 configured to isolate the communication module circuitry 504 from the internal I/O bus 136a. The isolation circuits 506 and 508 and any other isolation circuits implemented in the communication modules 124a-b may be implemented using optical isolation circuits or galvanic isolation circuits.

To isolate the communication module circuitry 502 from the power supply 514, the communication module 124a is provided with an isolation circuit 510. Similarly, the communication module 124b is provided with an isolation circuit 512 to isolate the communication module circuitry 504 from the power supply 514. By isolating the communication module circuitry 502 and 504 from the power supply 514, any power variation (e.g., power surges, current spikes, etc.) associated with the field devices 112a-b will not damage the power supply 514. Also, any power variations in one of the communication modules 124a-b will not damage or adversely affect the operation of the other one of the communication modules 124a-b.

In known process control systems, isolation circuits are provided in known marshalling cabinets, thereby reducing the amount of space available for known communication modules. However, providing the isolation circuits 506, 510, 508, and 512 in the communication modules 124a-b as shown in the illustrated example of FIG. 5 reduces the amount of space required in the marshalling cabinet 122 (FIG. 1) for isolation circuits, thereby increasing the amount of space available for communication modules (e.g., the communication modules 124a-c and 126a-c). In addition, implementing isolation circuits (e.g., the isolation circuits 506, 508, 510, and 512) in (e.g., integrate within) communication modules (e.g., the communication modules 124a-b) enables selectively using isolation circuits only with communication modules that require isolation. For example, some of the communication modules 124a-f and 126a-f of FIG. 1 may be implemented without isolation circuits.

An additional isolation circuit(s) (not shown) may be coupled between the communication module circuitry 502 and the field device 112a to isolate the communication module 124a from the other communication module 124d and the field device 112a. Similarly, an additional isolation circuit may be coupled between the communication module circuitry 504 and the field device 112b to isolate the communication module 124b from the other communication module 124e and the field device 112b. In this manner, the communication module circuitry 502 and 504 can be configured to follow (e.g., float relative to) the voltage levels of the field devices 112a and 112b, respectively, if power surges or other power variations occur in the I/O card 132a (FIG. 1), without affecting the voltage of the external busses 136a and 136b, respectively, and without causing damage to the field device 112a and 112b.

Figure 6A:
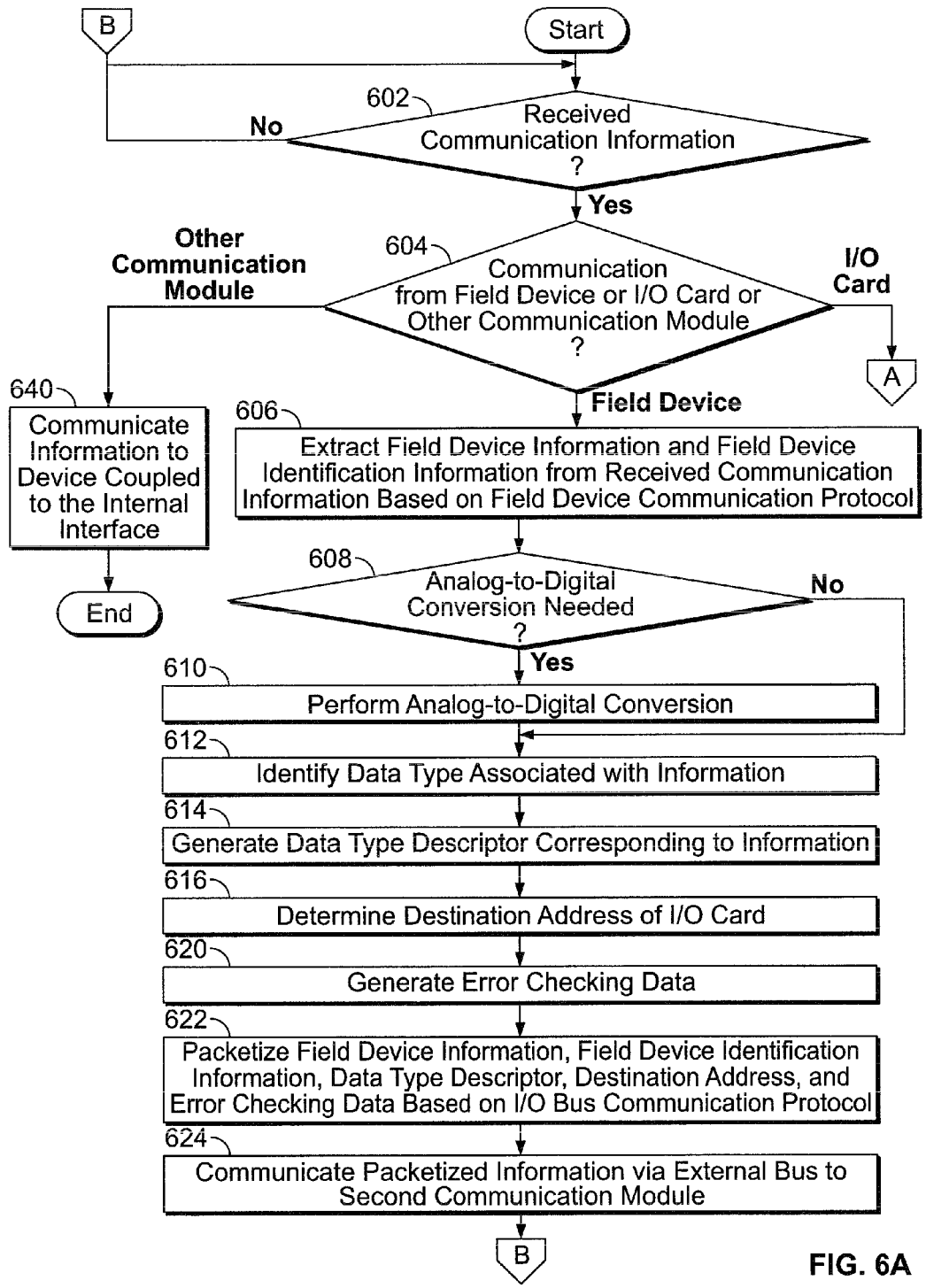
FIGS. 6A and 6B depict a flowchart of an example method that may be used to implement the communication modules of FIGS. 1 and 2 to communicate information between field devices and I/O cards.
Figure 6B:
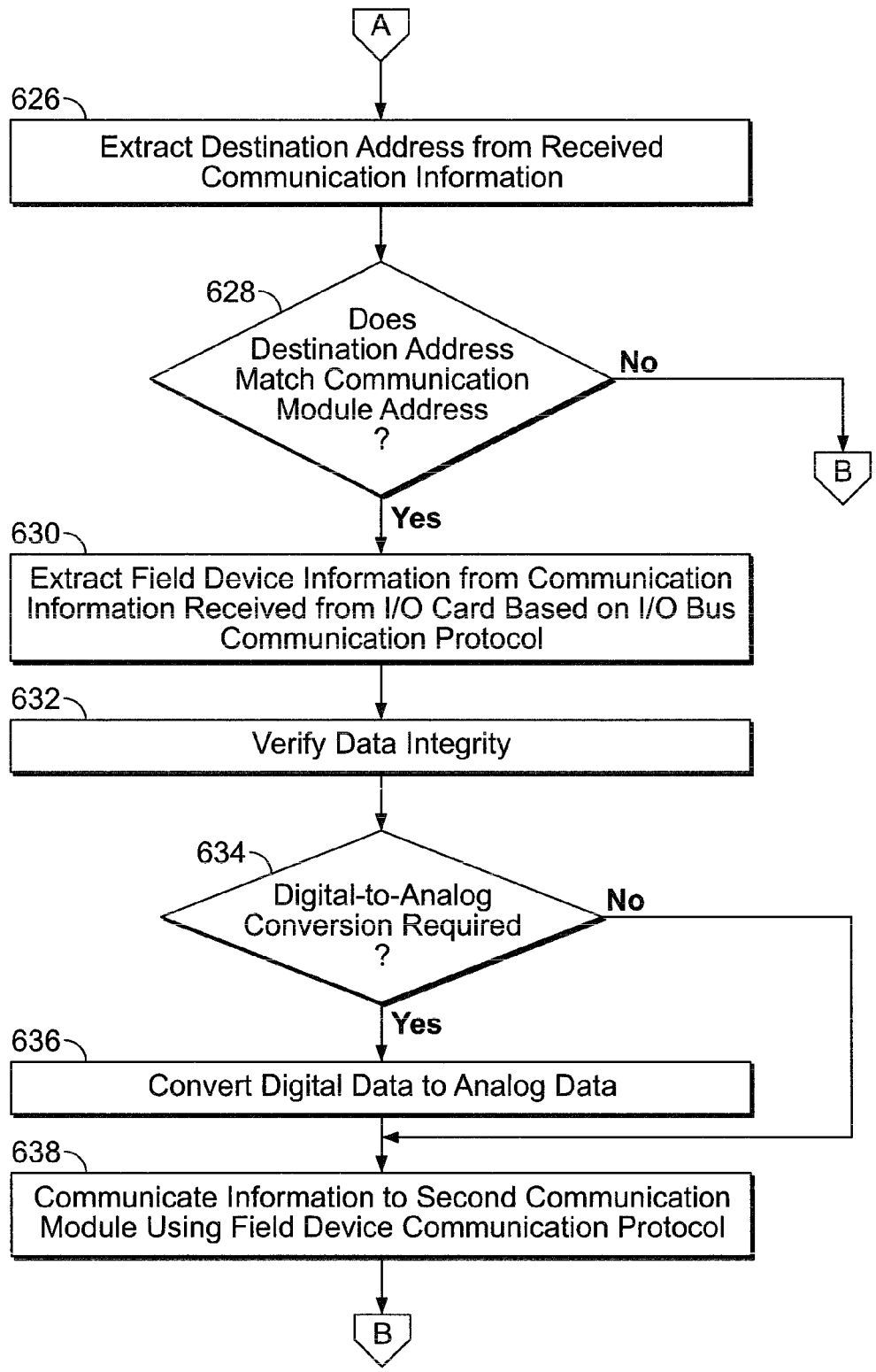

FIGS. 6A and 6B are flowcharts of example methods that may be used to implement communication modules (e.g., the communication modules 124a-f and 200 of FIGS. 1 and 2). In some example implementations, the example methods of FIGS. 6A and 6B may be implemented using machine readable instructions comprising a program for execution by a processor (e.g., the processor 712 shown in an example processor system 710 of FIG. 7). The program may be embodied in software stored on a tangible computer or processor readable medium such as a CD-ROM, a floppy disk, a hard drive, a digital versatile disk (DVD), or a memory associated with a processor 712 (FIG. 7) and/or embodied in firmware and/or dedicated hardware in a well-known manner. Further, although the example methods are described with reference to the flowcharts illustrated in FIGS. 6A and 6B, persons of ordinary skill in the art will readily appreciate that many other methods of implementing the example communication modules 124a-f and 200, described herein may alternatively be used. For example, the order of execution of the blocks may be changed, and/or some of the blocks described may be changed, eliminated, or combined.

Turning in detail to FIGS. 6A and 6B, the example methods of FIGS. 6A and 6B are described in connection with the example communication modules 124a, d of FIG. 1 and the example detailed communication module implementation of FIGS. 2 and 3. However, the example methods of FIGS. 6A and 6B may be used to implement any other communication module(s). The flowchart of FIGS. 6A and 6B is used to describe how the example communication modules 124a, d communicate information between the I/O card 132a and the field device 112a.

Initially, in one example the communication module 124a, d determines whether it has received communication information (block 602). For example, the communication module 124a, d determines that it has received communication information if the external bus communication processor 208 (FIG. 2) or the internal bus communication processor 220 indicates via, for example, an interrupt or a status register that communication information has been received. If the communication module 124a, d determines that it has not received communication information (block 602), control remains at block 602 until the communication module 124a, d receives communication information.

If the communication module 124a, d receives communication information (block 602), the communication module 124a, d determines whether it received the communication information from a field device (e.g., the field device 112a of FIG. 1) (block 604) based on, for example, an interrupt or status register of the internal bus communication processor 220 (FIG. 2) when the communication module 124d is coupled to a field device. If the communication module 124d determines that it has received communication information from the field device 112a (block 604), then the internal bus communication processor 220 extracts the field device information and the field device identification information from the received communication information associated with the field device 112*a* based on a field device communication protocol (block 606). The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device is communicatively coupled to communication module), and/or field device data type information (e.g., analog in (AI) data types, analog out (AO) data types, discrete in (DI) data types (e.g., digital in data types), discrete out (DO) data types (e.g., digital out data types), etc.). The field device communication protocol may be any protocol (e.g., a Fieldbus protocol, a HART protocol, an AS-I protocol, a Profibus protocol, etc.) used by the field device 112*a* or the communication protocol assigned to the field device 112*a* by the communication module 126*d*. In an alternative example implementation, at block 606, the field device communication processor 220 only extracts the field device information from the received communication information and the field device identification information identifying the field device 112*a* is stored in the communication module 124*d*. For example, when the field device 112*a* is initially connected to the communication module 124*d*, the field device 112*a* can communicate its identification information to the communication module 124*d* and the communication module 124*d* can store the identification information. As noted above, this information may also be stored in the database 133 or 135, the workstation 102, etc. This information may also be stored in the other communication module 124*a*.

The internal bus communication processor 220 then determines whether an analog-to-digital conversion is needed (block 608). For example, if the field device 112*a* communicates analog measurement values, the internal bus communication processor 220 determines that an analog to digital conversion is needed or required (block 608). If an analog to digital conversion is required, the analog-to-digital converter 218 (FIG. 2) performs the conversion on the received information (block 610).

After the analog-to-digital conversion (block 610) or if no analog-to-digital conversion is required (block 608), the internal bus communication processor 220 identifies the data type (e.g., analog, digital, temperature measurement, etc.) associated with the received field device information (block 612) and generates a data type descriptor corresponding to the received field device information (block 614). For example, the communication module 124*d* can store a data type descriptor that indicates the data type that it will always receive from the field device 112*a* or the field device 112*a* can communicate a data type to the communication module 124*d* that the field device communication processor 220 uses to generate the data type descriptor at block 610.

In an example in which the field device 112*a* does not include any internal communication circuitry and/or software but, rather, all communication circuitry and/or software are provided by the communication module, many of the blocks shown in FIGS. 6A and 6B may be skipped. For example, conversion from the communication protocol of the field device to that of the external bus (e.g., I/O channel) may be unnecessary where the communication protocol is initially provided by the communication module 124*d*.

The external bus communication processor 208 (FIG. 2) then determines the destination address of the I/O card 132*a* (block 616) to which the communication module 124*d* (and ultimately the communication module 124*a* as detailed below) is to communicate the information received from the field device 112*a*. For example the external bus communication processor 208 (FIG. 2) can obtain the destination address of the I/O card 132*a* from the address identifier 204 (FIG. 2). In addition, the external bus communication processor 208 determines or generates error checking data (block 620) to communicate to the I/O card 132*a* to ensure that the field device information is received by the I/O card 132*a* without errors. For example, the external bus communication processor 208 can generate cyclical error check (CRC) error checking bits. This may also be completed by the communication module 124*a*.

The external bus communication processor 208 then packetizes the field device information, the field device identification information, the data type descriptor, the destination address of the I/O card 132*a*, the source address of the communication module 124*d*, and the error checking data based on an external bus communication protocol (block 622). The external bus communication protocol may be implemented using, for example, a TPC-based protocol, a UDP-based protocol, etc. The external bus communication processor 208 can obtain the source address of the communication module 124*d* from the address identifier 204 (FIG. 2). The external bus interface 202 (FIG. 2) then communicates the packetized information via an external bus to the other communication module 124*a* (block 624).

One or more of the blocks shown in FIG. 6A may be completed by one or more other communication modules than the specific example detailed above. For example, after the data type descriptor of the corresponding information is generated (block 614), the communication module 124*d* may communicate the information to the other communication module 124*a*. The other communication module 124*a* may then determine the destination address of the I/O card 132*a* (block 620) and perform any subsequent methods detailed herein.

If instead at block 604, the communication module 124*a* determines that the communication information detected at block 602 is from the I/O card 132*a*, the internal bus communication processor 220 (FIG. 2) extracts a destination address from the received communication information (block 626). The external bus communication processor 220 then determines if the extracted destination address matches a destination address of the second communication module 124*d* (block 628) obtained from the address interface 204. If the destination address does not match the address of the communication module 124*d* (e.g., the received information was not intended for delivery to the communication module 124*d*) (block 628), control returns to block 602 (FIG. 6A). On the other hand, if the destination address matches the address of the communication module 124*d* (e.g., the received information was intended for delivery to the communication module 124*d*) (block 628), the internal bus communication processor 220 extracts the field device information from the received communication information based on the internal bus communication protocol (block 630) and verifies the integrity of the data (block 632) using, for example, a CRC verification process based on error detection information in the received communication information. Although not shown, if the internal bus communication processor 220 determines at block 632 that an error exists in the received communication information, the internal bus communication processor 220 sends a message to the I/O card 132*a* requesting a re-transmit.

After verifying the data integrity (block 632), the internal bus communication processor 220 (or the external bus communication processor 208) determines whether a digital-to-analog conversion is required (block 634). For example, if a data type descriptor stored in the communication module 124*a* indicates that the field device 112*a* requires analog information, then the internal bus communication processor 220 determines that a digital-to-analog conversion is required (block 634). If a digital-to-analog conversion is required (block 634), the digital-to-analog converter 216 (FIG. 2) performs the digital-to-analog conversion on the field device information (block 636). After the digital-to-analog conversion is performed (block 636) or if no digital-to-analog conversion is required (block 634), the external communication processor 208 communicates the field device information to the second communication module 124*d* and, thus, to the field device 112*a* via the external interface 222 (FIG. 2) using the field device communication protocol of the field device 112*a* or the communication protocol assigned thereto by the communication module 126*d* (block 638).

After the external communication processor 208 communicates the field device information to the other communication module (i.e., to the first communication module 124*a* when the information is sent from a field device to an I/O card and to the second communication module 124*d* when the information is sent from an I/O card to a field device), the process of FIGS. 6A and 6B returns to block 602.

If one of the first or second communication modules 124*a, d* performs the processes described above, then the other of the first or second communication modules 124*a, d* will detect a communication from the first one of the communication modules 124*a, d* that performed the process (block 602). Then the other of the first or second communication modules 124*a, d* detecting the communication communicates the received information to the device coupled to its internal interface (block 640). That is, the first communication module 124*a* communicates the information received from the second communication module 124*d* to the I/O card 132*a*, and the second communication module 124*d* communicates information received from the first communication module 124*a* to the field device 112*a*. However, in some examples, as noted above, upon receipt of information from the other of the first and/or second communication modules 124*a, d*, the other of the first and/or second communication modules 124*a, d* may execute one or more of the steps detailed herein. Upon delivery of the received information to the device coupled to the internal interface, the process of FIGS. 6A and B ends and/or control is returned to, for example, a calling process or function.

Figure 7:
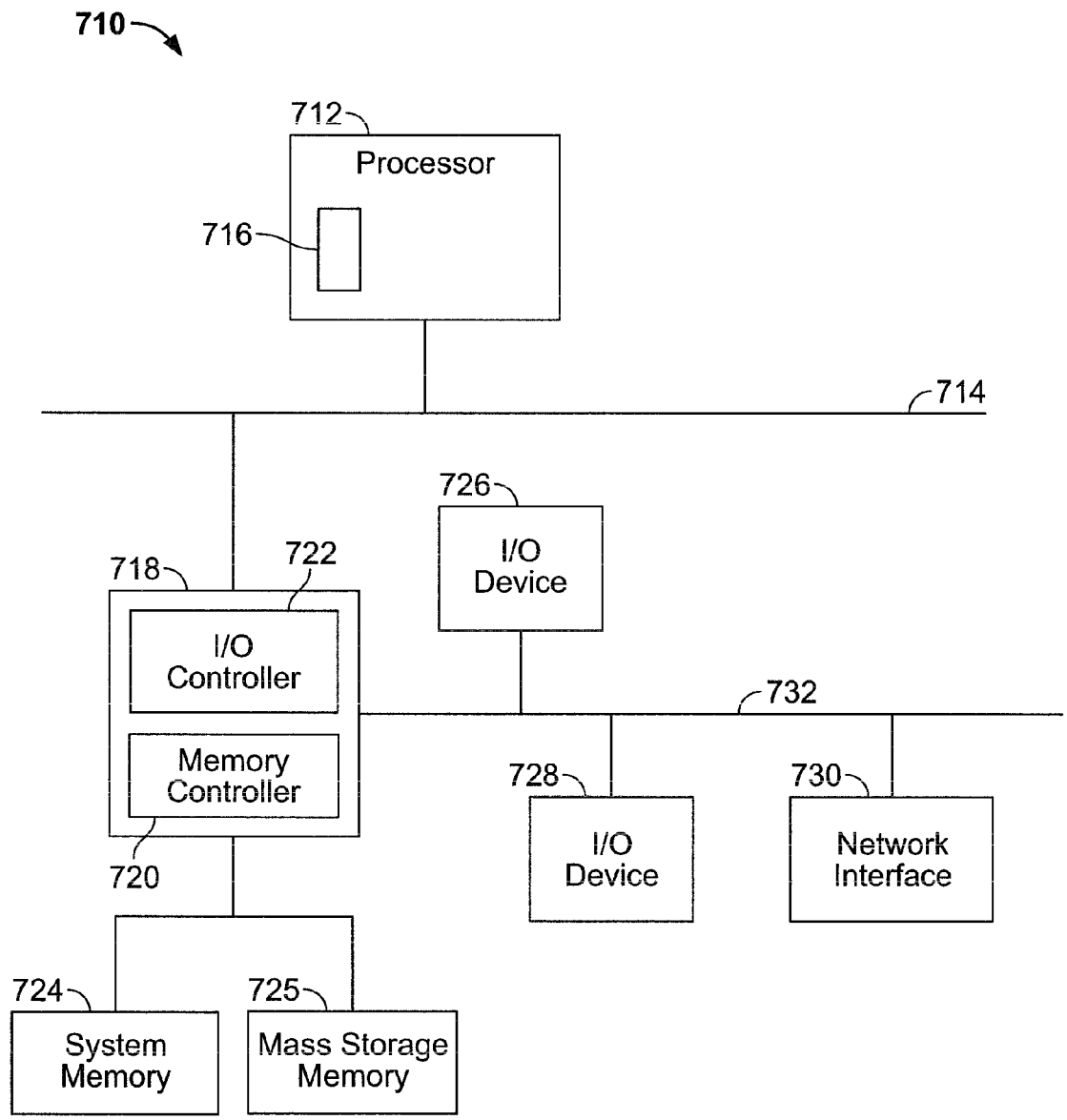
FIG. 7 is a block diagram of an example processor system that may be used to implement the example systems and methods described herein.

FIG. 7 is a block diagram of the example processor system 710 that may be used to implement the apparatus and methods described herein. For example, processor systems similar or identical to the example processor system 710 may be used to implement the workstation 102, the controller 104, the I/O cards 132*a-b* and 134*a-b*, and/or the communication modules 124*a-c* and 126*a-c* of FIG. 1. Although the example processor system 710 is described below as including a plurality of peripherals, interfaces, chips, memories, etc., one or more of those elements may be omitted from other example processor systems used to implement one or more of the workstation 102, the controller 104, the I/O card 132*a*, and/or the communication modules 124*a-c* and 126*a-c*.

As shown in FIG. 7, the processor system 710 includes the processor 712 that is coupled to an interconnection bus 714. The processor 712 includes a register set or register space 716, which is depicted in FIG. 7 as being entirely on-chip, but which could alternatively be located entirely or partially off-chip and directly coupled to the processor 712 via dedicated electrical connections and/or via the interconnection bus 714. The processor 712 may be any suitable processor, processing unit or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and a peripheral input/output (I/O) controller 722. As is well known, a chipset typically provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device. For example, if the example processor system 710 is used to implement the workstation 102 (FIG. 1), the mass storage memory 725 may include a hard disk drive, an optical drive, a tape storage device, etc. Alternatively, if the example processor system 710 is used to implement the controller 104, one of the I/O cards 132*a-b* and 134*a-b*, or one of the communication modules 124*a-f* and 126*a-f*, the mass storage memory 725 may include a solid-state memory (e.g., a flash memory, a RAM memory, etc.), a magnetic memory (e.g., a hard drive), or any other memory suitable for mass storage in the controller 104, the I/O cards 132*a-b* and 134*a-b*, or the communication modules 124*a-f* and 126*a-f*.

The peripheral I/O controller 722 performs functions that enable the processor 712 to communicate with peripheral input/output (I/O) devices 726 and 728 and a network interface 730 via a peripheral I/O bus 732. The I/O devices 726 and 728 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 730 may be, for example, an Ethernet device, an asynchronous transfer mode (ATM) device, an 802.11 device, a DSL modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

The example methods and systems described herein advantageously enable an operator of a process control system to employ a plurality of communication modules for a plurality of communication protocols that are interchangeably couplable to a plurality of field devices. This enables the operator of the process control system to quickly and easily change the communication protocol of a field device. For example, the operator may want to change the communication protocol of a field device from one communication protocol to another communication protocol where the other communication protocol has certain performance characteristics or other benefits that would be more advantageous for particular field devices in the process control system. In addition, the operator may wish to update a field device with a revised or upgraded communication protocol or use a communication protocol on a field device that was not in existence when the device was originally manufactured.

In addition, an operator of a process control system that includes state-of-the-art pre-release devices and communication protocols that have been incorporated into the system prior to the formal adoption of industry standards will be able to couple one of the example communication modules described herein that incorporates the industry standards into one of the pre-release field devices to update the device to meet the proper standards.

Another benefit realized with the example communication modules described herein is that the communication protocol of a field device may be changed while all of the device configuration information such as, for example, tag number, calibration settings, calibration history, span, etc., may be stored within a separate memory of the field device electronics and, thus, will not be lost when the communication module is changed.

In addition, some examples of the communication module may include diagnostics software that may be used to gather information from the field device. An operator may access newer, better, or more device-appropriate diagnostics by changing the communication module to another communication module having the desired diagnostics software. For example, a new diagnostics test may be developed to better assess a particular condition of a field device. With the example communication modules described herein, the new diagnostics test may be implemented on an established field device without changing the field device or the electronic circuit board of the existing field device. In addition, with the example communication modules described herein, the diagnostics software may be changed with or without changing the communication protocol of the field device.

Furthermore, in situations in which the electronics of a field device have failed and a change in the communication protocol and/or diagnostics would rectify the problem, the example communication modules described herein may be readily replaced as described herein. Changing the communication module is faster, easier and more cost effective than replacing an entire electronic circuit board of a failed, outdated, or otherwise deficient device. Further still, changing the communication module is also faster, easier and more cost effective than replacing an entire failed, out-dated, or otherwise deficient device. In addition, replacement of entire devices creates the potential for leaks, personal hazards encountered in breaking into pipes or vessels, a requirement for extra trade personnel, greater requirements for isolation and/or cleaning when pipes are disturbed, etc., all of which are avoided when the problem is rectified by changing the communication module.

Yet another benefit of the examples described herein is that manufacturers of field devices can separate the communications electronics and software and/or diagnostics electronics and software from the remaining electronics of the field devices. Thus, fewer varieties of circuit boards for the field devices need to be developed, manufactured, inventoried, etc. For example, if a manufacturer offers five field devices each in two different communication protocols, ten circuit boards (one for each device and protocol combination) will need to be produced. Using the example communication modules described herein, only five circuit boards (one for each device) and two types of communication modules (one type for each protocol) will need to be produce, thus greatly reducing the development and storage costs of the manufacturer. In addition, the communication modules can be used with other field devices.

Still further, the isolation circuitry described above with respect to FIG. 5 protects the power supply and field devices coupled to the example communication modules. In the event of an electrical spike or inadvertent wiring by an electrician to an unacceptably high voltage or current load, the isolation circuit causes the communication module to absorb the excessive load. Therefore, only the communication module may need replacement and the circuit board of the field device would remain functional which, as noted above, greatly decreases the costs of maintenance and repairs.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of changing a communication protocol of a first field device in a process control system, the method comprising:

decoupling from the first field device a first removable communication module configured to communicate using a first communication protocol, wherein the first communication module is removably coupled via a connector configured to enable removable coupling of the first communication module and the first field device; and coupling to the first field device a second removable communication module configured to communicate using a second communication protocol, wherein after coupling the second removable communication module, the first field device is configured to communicate using the second communication protocol, and wherein the first field device is coupled to a first communication channel on an input/output card when communicating using the first communication protocol and the first field device is coupled to the first communication channel on the input/output card when communicating using the second communication protocol.

2. A method as defined in claim 1, further comprising: decoupling from the first communication channel of the input/output card, a third removable communication module configured to communicate using the first communication protocol; and coupling to the input/output card a fourth removable communication module configured to communicate using the second communication protocol, wherein the fourth removable communication module is coupled to the first communication channel.

3. A method as defined in claim 1, wherein each of the first removable communication module and the second removable communication module provides substantially all communication software and electronics to the first field device.

4. A method as defined in claim 3, wherein the communications software includes revision software.

5. A method as defined in claim 4, wherein the revision software includes new features.

6. A method as defined in claim 3, wherein the communications software includes industry standards information.

7. A method as defined in claim 1, wherein the first removable communication module, when removed from the first field device, is couplable to a second field device.

8. A method as defined in claim 7, wherein the first field device is a different than the second field device.

9. A method as defined in claim 8, wherein the first field device is a different make or model than the second field device.

10. A method as defined in claim 1, wherein at least one of the first removable communication module or the second removable communication module includes isolation circuitry to electronically isolate the first field device.

11. A method as defined in claim 1, wherein the second removable communication module includes at least one of diagnostic software or electronics for use with the first field device.

12. A method as defined in claim 1, wherein at least one of the first removable communication module or the second removable communication module includes one or more contacts to mechanically and communicatively couple the first removable communication module or the second removable communication module to the first field device.

13. A method as defined in claim 12, wherein at least one of the first removable communication module or the second removable communication module is pluggable into the first field device.

14. A method as defined in claim 1, wherein at least one of the first removable communication module or the second removable communication module is coupled to the first field device via a base.

15. A method as defined in claim 1, wherein at least one of the first removable communication module or the second removable communication module includes local tagging information.

16. A method as defined in claim 15, wherein the local tagging information includes a serial number.

17. A method as defined in claim 1, wherein at least one of the first removable communication module or the second removable communication module contains information to configure or evaluate the field device.

18. A distributed process control system comprising:
an input/output card having a plurality of communication channels; and
a first field device having a first communication module removably coupled thereto to communicate using a first communication protocol, wherein the first communication module is removably coupled via a connector configured to enable removable coupling of the first communication module and the first field device, wherein the first field device is coupled to a first of the plurality of communication channels, wherein a second communication module is removably couplable to the first field device to replace the first communication module to communicate using a second communication protocol while the first field device is coupled to the first of the plurality of communication channels.

19. A system as defined in claim 18, further comprising a third removable communication module communicatively coupled to the first removable communication module to communicate therewith using the first communication protocol, wherein a fourth communication module is removably couplable to the second communication module to replace the third communication module to communicate using the second communication protocol.

20. A system as defined in claim 18, wherein the first and second communication protocols are different.

21. A system as defined in claim 18, wherein when removed from the first field device, the first communication module is coupled to a second field device.

22. A system as defined in claim 21, wherein the first field device is different than the second field device.

23. A system as defined in claim 22, wherein the first field device is a different make or model than the second field device.

24. A system as defined in claim 18, wherein the first communication module provides substantially all communications software and communications electronics to the first field device.

25. A system as defined in claim 24, wherein the communications software includes revision software.

26. A system as defined in claim 25, wherein the revision software includes new features.

27. A system as defined in claim 24, wherein the communications software includes industry standards information.

28. A system as defined in claim 18, wherein at least one of the first communication module or the second communication module includes isolation circuitry to electronically isolate the first field device.

29. A system as defined in claim 18, wherein the second communication module includes at least one of diagnostic software or electronics for the first field device.

30. A system as defined in claim 18, wherein at least one of the first communication module or the second communication module includes one or more contacts to mechanically and communicatively couple the first communication module or the second communication module to the first field device.

31. A system as defined in claim 18, wherein at least one of the first communication module or the second communication module is pluggable into the first field device.

32. A system as defined in claim 18, wherein at least one of the first communication module or the second communication module is coupled to the first field device via a base.

33. A system as defined in claim 18, wherein at least one of the first removable communication module or the second removable communication module includes local tagging information.

34. A system as defined in claim 33, wherein the local tagging information includes a serial number.

35. A system as defined in claim 18, wherein at least one of the first removable communication module or the second removable communication module contains information to configure or evaluate the field device.

* * * * *